INVENTOR.
John C. Blumenschein
BY
ATTORNEY.

2,812,758
SURGICAL RETRACTOR
John C. Blumenschein, Independence, Mo.

Application July 26, 1955, Serial No. 524,509

5 Claims. (Cl. 128—20)

This invention relates generally to the field of surgical instruments and, more particularly, to an improved type of surgical retractor for use in abdominal incisions.

Prior types of reactors for use in abdominal incisions have all been subject to various disadvantages of which one of the most common is an unnecessary mechanical complexity, rendering the device difficult or inconvenient for use by surgeons, as well as difficult to sterilize or clean. Such prior devices have, because of their complexity and multiplicity of parts, often included elements which are in the surgeon's way during an operation or involve parts which may actually be dangerous to the patient if not perfectly manipulated.

Accordingly, it is the primary object of this invention to provide a surgical retractor of simplified construction which overcomes all of the aforementioned and other disadvantages inherent in devices for the same general purpose known to the prior art.

It is another important object of the invention to provide such retractor apparatus which may be positively and easily manipulated by the surgeon without danger to the patient.

It is another important object of the invention to provide such retractor apparatus which, by virtue of its simplicity and minimization of parts, may easily and surely be cleaned and rendered sterile.

It is still another important object of this invention to provide such retractor apparatus which is adjustable to various sizes of incisions and adaptable to provide a maximum working aperture for the surgeon in each condition of adjustment.

It is another important object of this invention to provide such retractor apparatus, including guard or retainer elements which may be quickly and easily implaced thereon, to be positively held in place in any of a number of positions.

It is another important object of this invention to provide retractor apparatus which will support an abdominal incision around the entire circumference thereof with substantially equal holding pressure on all portions of the flesh surrounding the incision.

Another important object of this invention is to provide retractor apparatus whose simplicity renders the same capable of manufacture at a cost far below that of prior devices for a like purpose.

Still other important objects of the invention, including certain important details of construction, will be made clear or become apparent as the following specification progresses.

Figure 1:
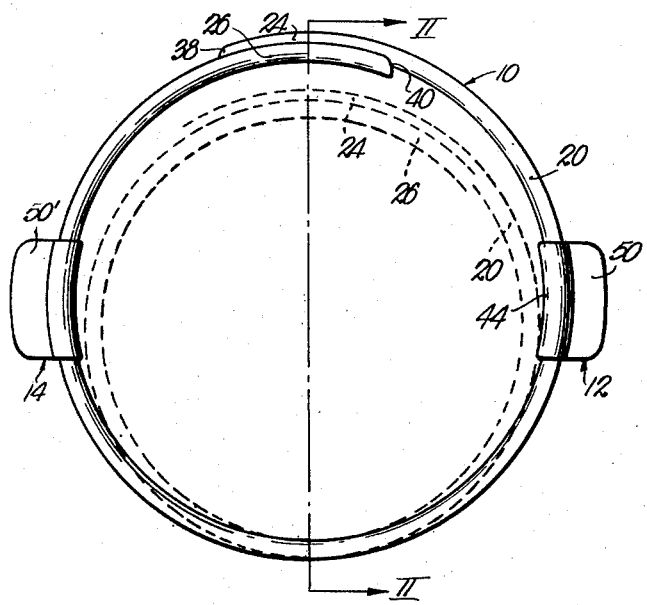
Figure 1 is a top plan view of the surgical retractor apparatus contemplated by this invention, showing an alternate position of diameter adjustment in the dotted lines.

Referring now to the drawing, the abdominal retractor apparatus of this invention includes a split, ring-like member, generally designated by the numeral 10, and a number of removable guard or retaining elements, a pair of which are illustrated and designated generally by the numerals 12 and 14.

The ring-like member 10 is comprised of a split, generally annular band 20, having outwardly curved marginal portions 22 along each longitudinal edge thereof to present a slight channel or U-shaped configuration, when the band 20 is considered in cross section. Such channel obviously faces outwardly from the band 20, the marginal portions 22 being adapted to extend slightly on either side of the flesh surrounding an incision with the holding pressure against such flesh being exerted by the intermediate portion of the width of band 20.

Figure 2:
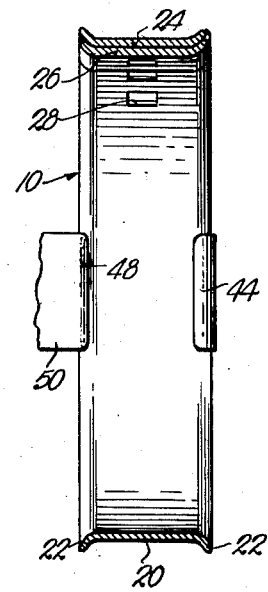
Fig. 2 is a cross sectional view taken on line II—II of Fig. 1.

As will be most clear from Fig. 2, the cross sectional configuration of the band 20 is uniform throughout its length so that a length 24 at one end of the band 20 will overlap a length 26 adjacent the opposite end thereof and, because of their complementary contour, be slidably received or nested within the channel of the latter.

As is indicated by the dotted lines in Fig. 1, the end lengths 24 and 26 of band 20 may be relatively shifted longitudinally of the band 20 to vary the diameter of the retractor ring 10. Such adjustability of diameter is obviously necessary in order to adapt the apparatus for use in incisions of various sizes.

Figure 3:
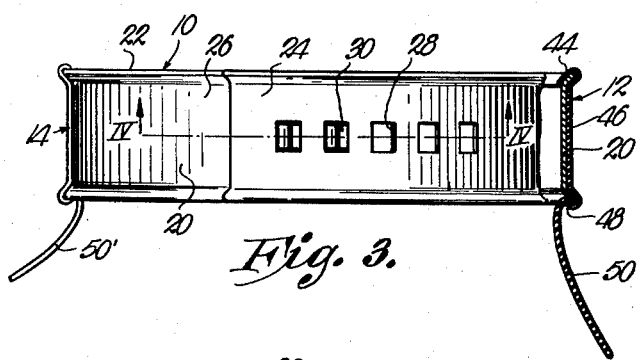
Fig. 3 is a side, elevational view of the retractor apparatus with parts broken away and shown in section for clarity of illustration, particularly showing the structure for rendering the apparatus adjustable in diameter.
Figure 4:
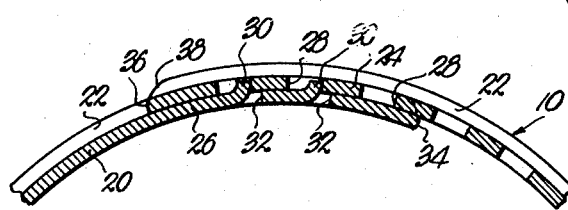
Fig. 4 is a fragmentary cross sectional view taken on line IV—IV of Fig. 3.

Referring now particularly to Figs. 3 and 4, it will be seen that the length 24 of band 20, which is always the outermost of the two overlapped lengths 24 and 26 thereof, is provided with a row of spaced perforations 28, while the length 26 of band 20, which is the innermost length, is provided with a row of outwardly protruding lugs 30. Lugs 30 are preferably formed by making substantially U-shaped cuts 32 in length 26 and then bending the lug portions 30 outwardly from the principal plane of the length 26 of band 20. It may be noted that the lugs 30 are bent relative to length 26 sufficiently to be received within the perforations 28 and thereby releasably hold the lengths 24 and 26 against relative movement in a direction which would decrease the diameter of the band 20. However, such lugs 30 are bent only to an extent such that they will not protrude through perforations 28 past the outward surface of length 24, it being obvious that the outer surface of band 20 must be substantially smooth and present no sharp edges, since it will be in engagement with the flesh surrounding an incision.

The band 20 could conceivably be formed of various materials, although the preferred material has been found to be a resilient metallic substance such as stainless steel. It will also be understood that the band 20 should have a normal configuration characterized by a smaller diameter than it is normally expanded to during use in an incision, since this will provide a spring-like action whereby the band 20 can be held in any position of adjustment of its circumference by the lugs 30 within the perforations 28. It will now be more apparent that the diameter of the band 20 can be quickly and easily adjusted to the desired size within an incision by the operating surgeon simply by expanding the band and permitting the lugs 30 to engage within appropriate corresponding perforations 28.

It will be understood that various edges presented on the band 20 may be rounded or smoothed as indicated at 34, 36, and 38 and 40, in order to prevent any possibility of injury to a patient or the surgeon manipulating the apparatus.

Referring now particularly to Fig. 3, it will be seen that each of the guard or retaining elements 12 and 14 is preferably integrally formed of stainless steel and includes an uppermost, U-shaped, hooked portion 44, adapted to fit over the uppermost of the marginal portions 22 of band 20, an intermediate portion 46 adapted to overlie the intermediate portion of band 20, a lower, generally U-shaped portion 48, adapted to snap over the lowermost of the marginal portions 22 of band 20 when the upper hooked portion 44 is implaced upon the upper marginal portion 22 of band 20, and, a depending retainer portion 50. In the case of the guard element 12, the retainer portion 50 extends downwardly for an appreciable length and curves slightly otuwardly, same being of the general configuration normally used for holding an intestinal pack or the like, while the depending portion 50' of element 14 is shorter and extends more pronouncedly outwardly so as to be adapted for use in retaining a urinary bladder or the like.

The guard elements 12 and 14, being themselves formed of resilient material, are adapted to be easily snapped into place or removed from the band 20 and to be securely retained in the selected position on the latter. In emplacing the guard elements 12 and 14 upon the ring 10, the physician has a virtually infinite choice of relative positions. It will also be understood that any number of elements such as 12 and 14 may simultaneously be used as required, the ring 10 obviously having utility of itself even when used without any elements 12 or 14 thereon.

In emplacing the member 10 within an incision, the surgeon first releases the lugs 30 from the perforations 28 and, if desired, squeezes the member 10 to decrease its diameter, then inserts the member 10 within the incision and expands the ring 10 to the desired diameter and places the lugs 30 within the proper perforations 28 to hold the ring 10 in such configuration. To remove the member 10 from an incision, the procedure for emplacement is simply reversed.

Structure of the type contemplated by this invention is ideally adapted for the accomplishment of all of the objectives above recited, although those skilled in the art will perceive that certain minor modifications or changes could be made from the exact details of the structure described for purpose of illustration without materially departing from the true spirit or intention of the invention. Accordingly, the invention is to be deemed limited only by the scope of the appended claims.

Having thus described the invention what is claimed as new and desired to be secured by Letters Patent is:

1. A surgical retractor for use in abdominal incisions comprising a single, unitary, elongated, resilient, band-like member arranged and having a normal disposition presenting a split, substantially annular ring, lengths of the member adjacent opposite ends thereof being adapted to be relatively overlapped by different amounts; and means for releasably interconnecting said lengths when so overlapped by various amounts.

2. In the retractor as set forth in claim 1, wherein are provided laterally extending marginal portions along the longitudinal edges of the member, presenting a pair of outwardly extending flanges along the upper end lower edges respectively of the ring.

3. In the retractor as set forth in claim 2, wherein are provided a number of retainer elements; and releasable, snap means on the elements cooperable with said flanges for releasably attaching said elements to said ring.

4. A surgical retractor for use in abdominal incisions comprising an elongated, resilient, band-like member arranged and having a normal disposition presenting a split, substantially annular ring, wherein lengths of the member adjacent opposite ends thereof are relatively overlapped, one of said lengths being provided with a plurality of perforations therein spaced longitudinally of the member, and the other of said lengths being provided with a number of laterally extending lugs adapted to be received within said perforations for holding said lengths against relative movement in a direction which would decrease the diameter of the ring.

5. In the retractor as set forth in claim 4, wherein are provided laterally extending marginal portions along the longitudinal edges of the member, presenting a pair of outwardly extending flanges along the upper and lower edges respectively of the ring; and a number of retainer elements each including releasable clamping means cooperable with said flanges for removably securing said elements on said ring.

References Cited in the file of this patent

UNITED STATES PATENTS

| 447,761   | Clough | Mar. 10, 1891 |
| 1,944,009 | Homer  | Jan. 16, 1934 |
| 1,983,969 | Davis  | Dec. 11, 1934 |
| 2,313,164 | Nelson | Mar. 9, 1943  |